United States Patent [19]
O'Connor et al.

[11] Patent Number: 5,810,528
[45] Date of Patent: Sep. 22, 1998

[54] AUTOMATICALLY TUNEABLE ANTI-VIBRATION BORING SYSTEM

[75] Inventors: Timothy J. O'Connor, Troy; Alex Wakulenko, Cohoes, both of N.Y.

[73] Assignee: The United States of America as represented by the Secretary of the Army, Washington, D.C.

[21] Appl. No.: 762,573

[22] Filed: Dec. 9, 1996

Related U.S. Application Data

[60] Provisional application No. 60/027,288 Oct. 1, 1996 and provisional application No. 60/020,965 Jun. 17, 1996.

[51] Int. Cl.$^6$ .................................................. B23B 39/00
[52] U.S. Cl. ........................................... 409/141; 408/143
[58] Field of Search ................................ 408/6, 11, 143; 409/141

[56] References Cited

U.S. PATENT DOCUMENTS

| | | | |
|---|---|---|---|
| 5,170,103 | 12/1992 | Rouch et al. | 408/143 |
| 5,518,347 | 5/1996 | Cobb, Jr. | 408/143 |
| 5,558,477 | 9/1996 | Browning et al. | 408/143 |

*Primary Examiner*—Daniel W. Howell

[57] ABSTRACT

A lead slug is axially slidably mounted within a longitudinal cavity in the boring shaft of an automatically tuneable anti-vibration boring system. The lead slug is resiliently held in the longitudinal cavity by resilient spring members at its axial ends thereby permitting resonant axial vibration at a frequency determined by the mass of the lead slug and the spring constant of the resilient spring members. A vibration detector within the boring shaft transmits a vibration signal to a controller in response to a vibration of the boring system. The controller transmits a signal to a linear actuator which changes a preload on the resilient spring members, and thereby changes the resonant axial vibration frequency of the lead slug. The linear actuator moves toward or away from the lead slug until the lead slug, resonating at its resonant frequency, reduces the vibration of the boring system.

14 Claims, 4 Drawing Sheets

AUTOMATICALLY TUNEABLE ANTI-VIBRATION BORING SYSTEM

U.S. GOVERNMENT INTEREST

The invention described herein may be made, used, or licensed by or for the U.S. Government for Governmental purposes.

This application is a continuation-in-part of application Ser. Nos. 60/027,288, filed Oct. 1, 1996, and Ser. No. 60/020,965, filed Jun. 17, 1996, the entire file wrapper contents of which applications are herewith incorporated by reference as though fully set forth herein at length.

BACKGROUND OF THE INVENTION

The present invention relates to the field of deep-hole boring operations, sometimes known as gun boring. More specifically, the present invention relates to the automatic reduction of vibration and chatter during the boring process.

Deep-hole boring requires extremely long boring bars to reach the desired depth of boring. Since the boring bars are long and relatively slim, the cantilevers supporting the bars are necessarily large. During boring, a rotating cutting head of the boring bar produces chatter and vibration resulting in increased wear on all mechanical interfaces of the boring system. The chatter and vibration produce a poor surface finish in the hole being bored. The poor surface finish makes it increasingly difficult to bore at depths below the poor surface finish. If the chatter and vibration are allowed to continue, wear on the mechanical connections may eventually cause the boring system to fail catastrophically.

To reduce the vibration, the metal removal rate can be decreased. However, this approach interferes with production and only minimally reduces the amount of vibration.

Attempts to eliminate the vibration in the boring bar include using a boring bar fabricated from solid carbide. The solid carbide, because of its inherently high density, reduces the amount of chatter and vibration transferred through the boring bar. However, solid carbide is extremely expensive. A steel boring bar can be made for close to ⅛ the price of a solid carbide bar. Furthermore, solid carbide is a very brittle material. Although chatter and vibration are reduced by the inherently high density of the solid carbide bar, vibration nonetheless frequently builds to a level that causes catastrophic failure of the boring bar. Also, extreme caution is required by the deep-hole boring operators during setup because minor impacts of the boring bar with other objects could cause the carbide to shatter during setup. Finally, the carbide bar is a passive system.

A further attempt to reduce vibration in boring bars includes mounting a damping device, such as a lead slug, supported on rubber bushings in silicone fluid, inside the boring bar at the "business end" of the boring bar. The slug oscillates axially in response to vibration induced in the boring bar to cancel out the vibration. However, tuning of the damping device is required to accommodate instantaneous parameters such as the speed the boring bar is rotating, the length of the boring bar, and the type of cutting tool connected at the end of the bar. The adjustment is made by moving the damping device to a different location with respect to the center of the boring bar, changing the length of the boring bar, and also raising or lowering the fluid level in the damping cavity. These adjustments change the tuning frequency of the system.

Tuning of the boring system must be done during the cutting process. Coarse tuning can be performed before the cutting is started based on the operator's experience. Fine tuning the system to adequately reduce the vibration, the operator monitors the boring operation by listening to the boring bar and feeling the boring bar during operation to determine whether the vibration are adequately reduced. This can be hazardous because to listen to and feel for vibration the operator must be in close proximity to rotating parts and to the hot chips and other airborne articles that are ejected from the bore hole during the boring process. After determining that an adjustment is necessary, the damping device must be accessed to make the adjustment. Since the adjustment is near the cutting end of the bar, this is a laborious task.

In U.S. Pat. No. 3,838,936 ('936) springs are compressed axially in a controllable way at each end of the damping device (lead slug). The adjustment is made at the upper end of the boring bar so the bar need not be totally removed from the hole being bored for adjustment. However, the adjustment must still be made manually and the operator must still determine the need for adjustment by sound and feel during the boring operation.

OBJECTS AND SUMMARY OF THE INVENTION

It is an object of the present invention to provide a tuneable anti-vibration boring system that overcomes the drawbacks of the prior art.

It is another object of the present invention to provide a tuneable anti-vibration boring system that eliminates the need for manual monitoring of the boring process.

It is still another object of the present invention to provide a tuneable anti-vibration boring system that eliminates manual tuning during the boring process.

Briefly stated, a lead slug is axially slidably mounted within a longitudinal cavity in the boring shaft of an automatically tuneable anti-vibration boring system. The lead slug is resiliently held in the longitudinal cavity by resilient spring members at its axial ends thereby permitting resonant axial vibration at a frequency determined by the mass of the lead slug and the spring constant of the resilient spring members. A vibration detector within the boring shaft transmits a vibration signal to a controller responsive to a vibration of the boring system. The controller transmits a signal to a linear actuator which changes a preload on the resilient spring members, and thereby changes the resonant axial vibration frequency of the lead slug. The linear actuator moves toward or away from the lead slug until the lead slug, resonating at its resonant frequency, reduces the vibration of the boring system.

According to an embodiment of the present invention, there is provided, a boring system including, a boring shaft having an upper end and a lower end, the lower end cutting tool holder affixed thereto, a transducer positioned to receive vibration from the cutting tool holder during operation of the boring system, and for producing a vibration signal in response thereto, a damping device axially slidably mounted within the boring shaft, at least one resilient element axially supporting the damping device thereby permitting resonant axial motion of the damping device in the boring shaft and means for automatically adjusting a static compression of the at least one resilient element toward a value at which the resonant axial motion reduces the vibration signal.

According to another embodiment of the present invention, there is provided, an apparatus for automatically tuning an anti-vibration boring system including, a boring shaft having an upper end and a lower end, a transducer, the transducer including means for generating a first signal responsive to an induced vibration in the boring shaft, a mass axially slidably mounted within a longitudinal cavity in the boring shaft, the mass being held within the longitudinal cavity by shock absorbers at axial ends of the mass and adjusting means responsive to the first signal for adjusting a resonant frequency of the mass and shock absorbers in a sense effective to reduce the induced vibration.

According to still another embodiment of the present invention, there is provided, an apparatus for automatically tuning an anti-vibration boring system including, a boring shaft having an upper end and a lower end, a piezo-electric accelerometer receiving an induced vibration in the boring shaft, a mass axially slidably mounted on the boring shaft, resilient members supporting opposed longitudinal ends of the mass, whereby the mass is free to move resiliently on the boring shaft at a resonant frequency dependent on the mass and on a spring constant of the resilient members and means for controlling the spring constant in response to the induced vibration, thereby controlling the resonant frequency.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
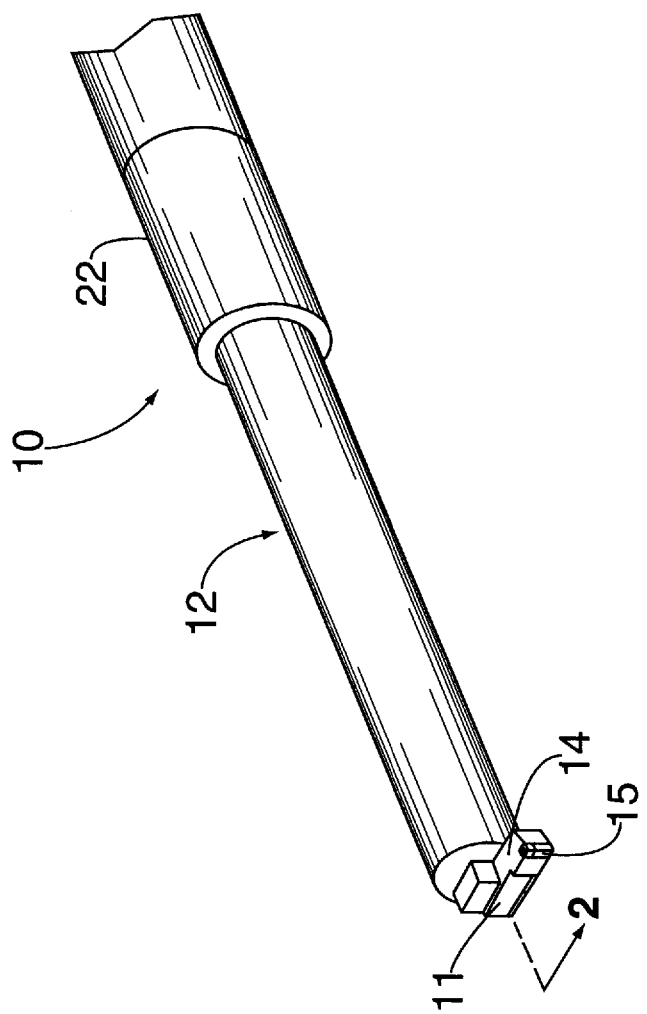
FIG. 1 is a perspective view of an anti-vibration boring bar according to an embodiment of the present invention.

Referring to FIG. 1, a boring bar 10 of the present invention includes a cutting head 11 mounted on a lower end of a boring shaft 12. Cutting head 11 includes a tool holder 14 holding a carbide insert 15. An actuator unit 13 is mounted at an upper end of boring shaft 12. Actuator unit 13 controls a resonant frequency of an oscillating damping device mounted within boring shaft 12, as will be described later in more detail. Boring shaft 12 also includes a stiffener collar 22 at a location where a diameter of boring shaft 12 is reduced.

Figure 2:
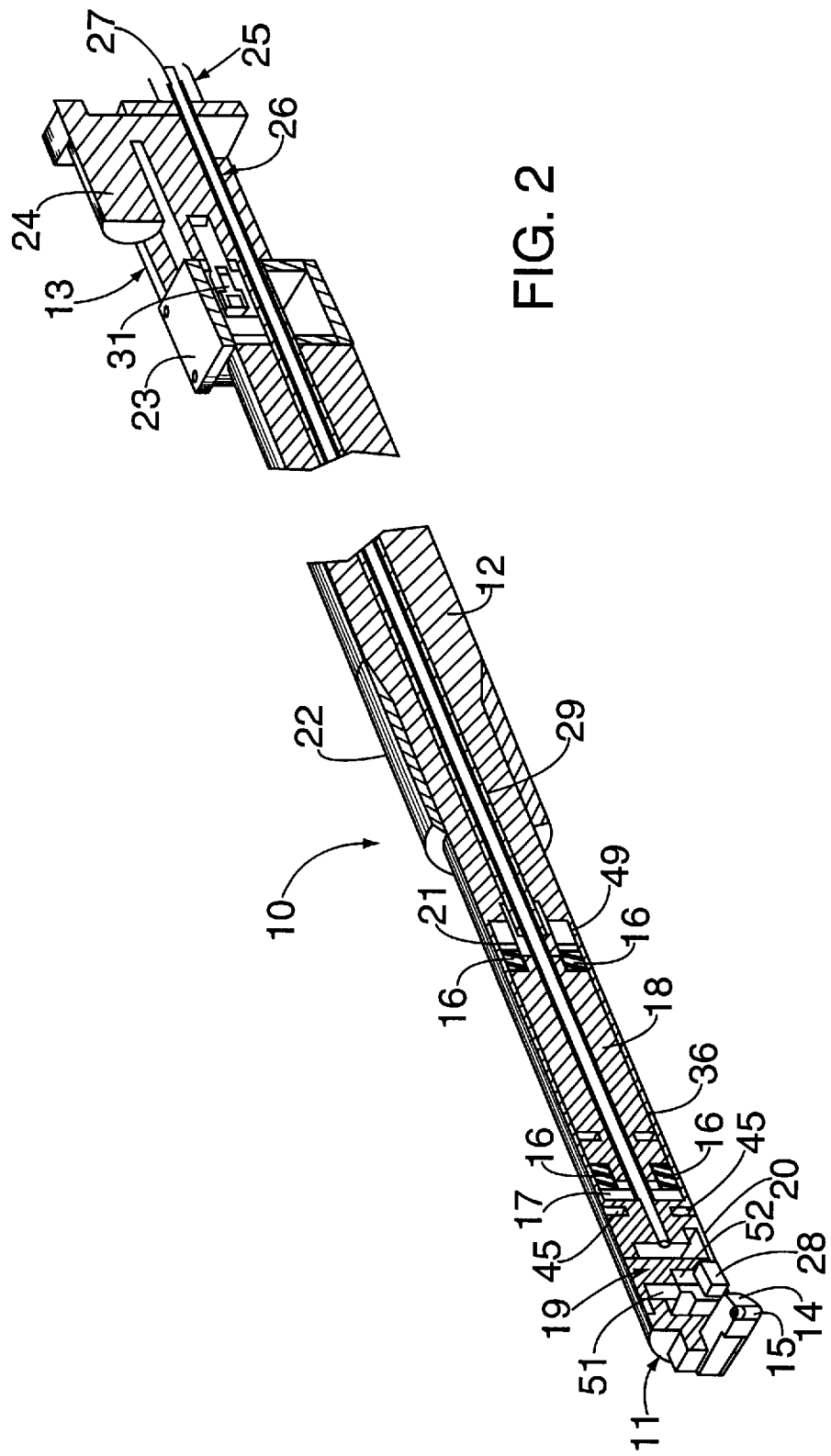
FIG. 2 is a section view of the anti-vibration boring bar taken along II—II in FIG. 1.

Referring now to FIG. 2, a transducer housing 19 within boring shaft 12, directly behind cutting head 11, contains a transducer 28. Transducer 28 is a piezo-electric type accelerometer which creates a voltage signal in response to vibration transmitted to it from cutting head 11 during boring.

Transducer housing 19 is mounted as close as possible behind cutting head 11 to thereby produce the truest response to vibration and chatter occurring at cutting head 11. However, other locations may be found for transducer housing 19 along the length of boring shaft 12 without interfering with its desired function. The voltage signals produced by transducer 28 are carried by conductors (not shown) running through a wire tube 27. Wire tube 27 runs through the center of boring shaft 12 from transducer housing 19 through the upper end of boring shaft 12.

Transducer 28 is preferably a piezo-electric device. The properties of piezo-electric materials are well suited for this application. However, transducer 28 can be any type of transducer known in the art which produces a signal in response to vibration in boring shaft 12.

Transducer housing 19 optionally houses a temperature detector 51. Temperature detector 51 transmits a temperature signal responsive to a temperature in boring bar 10 directly behind cutting head 11. The temperature signal is received by a monitoring device which will be described later in more detail.

Transducer housing 19 further houses a deflection sensor 52 responsive to movements of cutting head 11 perpendicular to an axis of boring shaft 12. The deflection sensor transmits a deflection signal which is also received by a monitoring device which will be described later in more detail.

Boring shaft 12 includes a load cell 20 mounted behind transducer 28. A longitudinal cavity 36 behind load cell 20 contains a lead slug 18 axially slidably mounted therein. Ends of lead slug 18 are resiliently supported by resilient shock absorbers 16 between the fore and aft ends of lead slug 18 and ends of longitudinal cavity 36. Lead slug 18 oscillates within longitudinal cavity 36 axially along the length of longitudinal cavity 36 in response to vibration and chatter of boring bar 10. When the resonant frequency of the oscillation of lead slug 18 is correctly tuned, vibration of boring bar 10 is effectively damped.

A lower resilient shock absorber 16 at a lower end of lead slug 18 is urged against an end stop 17. End stop 17 is made of a rigid material. End stop 17 transmits a force from shock absorber 16 to load cell 20. Load cell 20 generates a load signal proportional to the force exerted on end stop 17 by shock absorber 16. Conductors (not shown) carry the load signal generated by load cell 20 through wire tube 27 to a monitoring device which will be described later in more detail.

An upper resilient shock absorber 16 at an upper end of lead slug 18 is compressed between lead slug 18 and a bottom surface of a pusher 21. The bottom surface of pusher 21 defines an upper end of longitudinal cavity 36. Pusher 21 is urged against shock absorber 16 at the upper end of lead slug 18 by a pusher tube 29. Pusher tube 29 runs through boring shaft 12 from pusher 21 to an actuator housing 23 at the upper end of boring shaft 12. Pusher tube 29 is concentric with wire tube 27.

Axial movement of pusher tube 29 moves pusher 21 toward or away from lead slug 18, thereby adjusting the static load on the upper and lower resilient shock absorbers 16. As is well known, the resonant frequency of a mass, such as lead slug 18, resiliently supported at its ends, such as by shock absorbers 16, is dependent on the spring constant of shock absorbers 16, and the mass of lead slug 18. More precisely, the resonant frequency is equal to the square root of the spring constant of the resilient material of resilient shock absorbers 16 divided by the mass of lead slug 18. Adjusting the preloading of resilient shock absorbers 16 by moving pusher tube 29 in or out controls the spring constant, and therefore controls the resonant frequency in a known manner. That is, the resonant frequency is proportional to the square root of the spring constant.

An actuator 24, mounted behind actuator housing 23 reacts responsively to signals from transducer 28 to move a link mechanism 31. Link mechanism 31 pushes or pulls pusher tube 29 thereby moving pusher 21. Therefore, the position of link mechanism 31 controls the resonant frequency of oscillation of lead slug 18. A servo-controller mechanism (which will be discussed later) varies the position of link mechanism 31, in response to the signals from transducer 28 until the oscillatory motion of lead slug 18 cancels the vibration induced in boring bar 10.

A coolant housing 25 at the upper end of boring bar 10 is connected to a coolant tube 26 which runs through boring bar 10 to terminate in a position in close proximity to cutting head 11. Coolant (not shown) supplied to coolant housing is directed through coolant tube 26. The coolant then flows out of boring bar 10, through ports 45 at the bottom of boring shaft 12, into the hole being bored. The coolant prevents cutting head 11 from becoming overheated. The coolant also carries debris created by the boring process up and out of the hole being bored.

Figure 3:
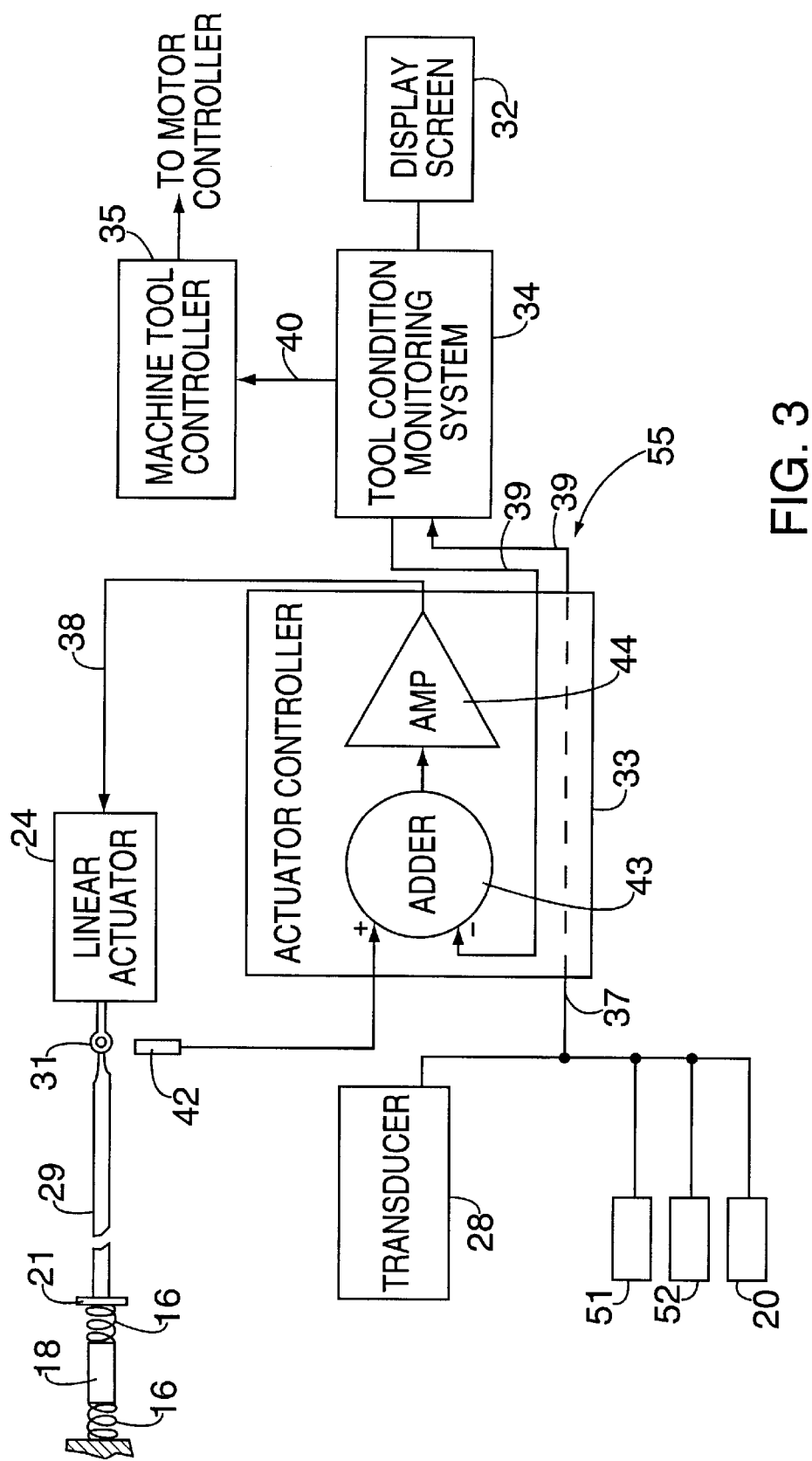
FIG. 3 is an simplified block diagram of an automatically tuneable anti-vibration boring system according to an embodiment of the present invention.

Referring now to FIG. 3, lead slug 18 is resiliently supported between shock absorbers 16. Shock absorbers 16 may be of any convenient type such as the metallic springs shown, but are preferably of resilient rubber or plastic. Transducer 28, in an automatically tunable anti-vibration boring system 55, transmits an analog vibration signal to a Tool Condition Monitor System (TCMS) 34 responsive to induced vibration in boring shaft 12 (Boring shaft 12 is not shown in FIG. 3). The analog vibration signal travels from transducer 28 through transducer housing cable 37 and sensor cable 39. TCMS 34 digitizes the analog vibration signal. TCMS 34 then transmits a position command signal back through sensor cable 39 to a minus input of an adder 43 in an actuator controller 33.

A position sensor 42 generates a position signal responsive to a position of link mechanism 31. As explained above, the position of link mechanism 31 is related in a known way to the resonant frequency of lead slug 18. The position signal from position sensor 42 is transmitted as a feedback signal to a plus input of adder 43. Adder 43 calculates the difference between the position command signal and the feedback signal. An error signal from adder 42 is proportional to the amplitude of the difference between its two inputs, and with a polarity dependent on the relationship between the command and feedback signals. Based on the difference between the command and feedback signals, i.e., the error signal, an amplifier 44 in actuator controller 33 generates a correction signal which is transmitted through an actuator cable 38 to actuator 24. In response to the correction signal, actuator 24 moves link mechanism 31 in a direction to reduce the error signal. Amplifier 44 continuously transmits the correction signal to maintain the resonant frequency of lead slug 18 at a value which minimizes the induced vibration and cancels their detrimental effects.

Figure 4:
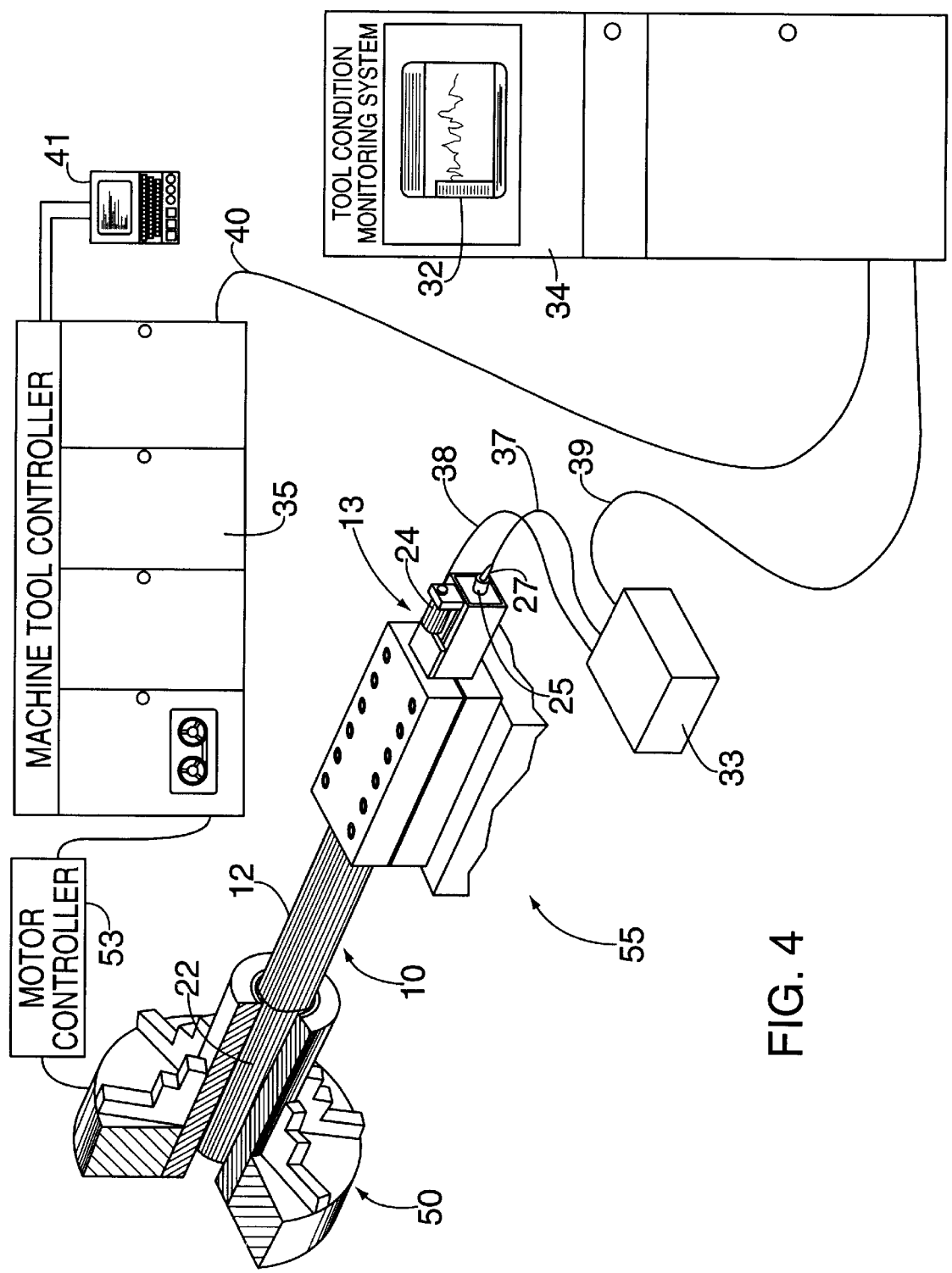
FIG. 4 is a perspective and schematic diagram, partially cut away, of the anti-vibration boring system of the present invention.

Referring now also to FIG. 4, in addition to the analog vibration signal from transducer 28, TCMS 34 also receives signals from an optional temperature sensor 51, deflection sensor 52, and load cell 20. Each of these signals is carried on a separate conductor in transducer housing cable 37 through actuator controller 33. TCMS 34 transmits the data it receives to machine tool controller 35 via a data cable 40 which uses this data to control boring parameters. An optional display screen 32 displays the data contained in these signals, as well as other data, to a user of boring bar 10.

Machine tool controller 35 monitors the incoming data and compares the data to predetermined setpoints. The predetermined setpoints vary based on the particular configuration of boring bar 10 being used such as the type of cutting head, the length of the boring bar, and the type of material being bored. The predetermined setpoints are input to machine tool controller 35 by the user using input device 41. Input device 41 can be any type of interface known in the art such as a keyboard.

If any one of the parameters being monitored by machine tool controller 35 exceeds its corresponding predetermined setpoint, machine tool controller 35 automatically alarms to notify the user. If the parameter is extremely high or low, machine tool controller interrupts the boring process and alerts the operator regarding which setpoint was exceeded.

Automatically tunable anti-vibration boring system 55 includes a motor 50 having internal splines mating with external splines on a stiffener 22 on shaft 12. Motor 50 applies rotational force to boring shaft 12 while the splined connection permits boring shaft 12 to be advanced into the bored hole. Only cutting head 11, tool holder 14, and carbide insert 15 (cutting head 11, tool holder 14, and carbide insert 15 are shown in FIGS. 1 and 2) rotate with boring shaft 12 and stiffener 22. The other components, shown in FIG. 2, mounted within and at the upper end of boring shaft 12 are stationary while boring shaft 12 rotates during the boring process.

A motor controller 53 receives control commands from machine tool controller 35 to control the amount of power delivered to motor 50 responsive to the control commands it receives. Machine tool controller 35 also monitors the power load of motor 50 during the boring operation.

Instead of using lead slug 18, a damping device of any other material having sufficient density to cancel the vibration induced in the boring bar during boring operations can be used.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A boring system comprising:

a boring shaft having an upper end and a lower end;

said lower end having a cutting tool holder affixed thereto;

a transducer positioned to receive vibration from said cutting tool holder during operation of said boring system, and for producing a vibration signal in response thereto;

a damping device axially slidably mounted within said boring shaft;

at least one resilient element axially supporting said damping device thereby permitting resonant axial motion of said damping device in said boring shaft; and means for automatically adjusting a static compression of said at least one resilient element toward a value at which said resonant axial motion reduces said vibration signal.

2. The apparatus of claim 1, wherein said means for automatically adjusting includes:

a pusher;

a controller for controlling an axial position of said pusher; and said pusher being connected to apply an axial force to said at least one resilient element, whereby a spring constant of said at least one resilient element is controlled.

3. The apparatus of claim 2, wherein said means for automatically adjusting further includes:

first means for creating a first signal proportional to a desired position of said pusher;

second means for creating a second signal proportional to an actual position of said pusher; and a comparator including means for generating a correction signal variable at least in amplitude responsive to a difference between said first signal and said second signal.

4. The apparatus of claim 3, wherein:

said second means is a position sensor; and said position sensor is responsive to a position of said pusher.

5. The apparatus of claim 3, further including:

a monitoring system;

said boring shaft including means for generating a load signal responsive to a force exerted on said tool holder;

said boring shaft including means for generating a temperature signal responsive to a temperature at said lower end of said boring shaft;

said boring shaft including means for generating a deflection signal responsive to deflection of said lower end of said boring shaft in a direction perpendicular to said axial direction; and said monitoring system including means for displaying at least one of said first and second signals, said load signal, said temperature signal, and said deflection signal.

6. The apparatus of claim 5, further including:

a machine tool controller; and said machine tool controller including means for alarming when one of said first and second signals, said load signal, said temperature signal, and said deflection signal exceeds a first predetermined setpoint.

7. The apparatus of claim 6, wherein said machine tool controller includes means for halting a boring operation when one of said first and second signals, said load signal, said temperature signal, and said deflection signal exceeds a second predetermined setpoint.

8. The apparatus of claim 7, wherein said machine tool controller includes means for permitting manual input of at least one of said first predetermined setpoint and said second predetermined setpoint.

9. The apparatus of claim 1, wherein said transducer is a piezo-electric element.

10. An apparatus for automatically tuning an anti-vibration boring system comprising:

a boring shaft having an upper end and a lower end;

a transducer;

said transducer including means for generating a first signal responsive to an induced vibration in said boring shaft;

a mass axially slidably mounted within a longitudinal cavity in said boring shaft;

said mass being held within said longitudinal cavity by shock absorbers at axial ends of said mass; and adjusting means responsive to said first signal for adjusting a resonant frequency of said mass and shock absorbers in a sense effective to reduce said induced vibration.

11. The apparatus of claim 10, wherein said adjusting means includes:

an axially movable pusher member effective for applying a static force on said shock absorbers, whereby said resonant frequency is controllable; and an actuator for moving said pusher along an axial direction responsive to said first signal.

12. The apparatus of claim 11, further including a monitoring device including means for displaying a parameter of said first signal.

13. The apparatus of claim 10, further including:

a controller; and said controller including means for shutting said boring system when a level of said induced vibration exceeds a predetermined level.

14. An apparatus for automatically tuning an anti-vibration boring system comprising:

a boring shaft having an upper end and a lower end;

a piezo-electric accelerometer receiving an induced vibration in said boring shaft;

a mass axially slidably mounted on said boring shaft;

resilient members supporting opposed longitudinal ends of said mass, whereby said mass is free to move resiliently on said boring shaft at a resonant frequency dependent on said mass and on a spring constant of said resilient members; and means for controlling said spring constant in response to said induced vibration, thereby controlling said resonant frequency.

* * * * *